US012645903B2

(12) United States Patent　　　　(10) Patent No.:　US 12,645,903 B2

Cardwell et al.　　　　　　　　　　(45) Date of Patent:　　Jun. 2, 2026

(54) LATCH VERIFICATION UTILIZING A SCANNABLE IMAGE

(71) Applicant: Cooper-Standard Automotive Inc., Northville, MI (US)

(72) Inventors: Brian James Cardwell, Ypsilanti, MI (US); Kenneth Gocha, Flint, MI (US); Stephen S. Frederiksen, Clarkston, MI (US); Christian A. Veraza, Auburn Hills, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 0 days.

(21) Appl. No.: 18/599,737

(22) Filed: Mar. 8, 2024

(65) Prior Publication Data

US 2025/0284909 A1　　Sep. 11, 2025

(51) Int. Cl.
　　　*G06K 7/14*　　　　(2006.01)
　　　*F16L 37/12*　　　　(2006.01)
(52) U.S. Cl.
　　　CPC ........ *G06K 7/1417* (2013.01); *F16L 37/1235* (2013.01); *F16L 2201/10* (2013.01); *F16L 2201/60* (2013.01)
(58) Field of Classification Search
　　　CPC ............... G06K 7/1417; F16L 37/1235; F16L 2201/10; F16L 2201/60
　　　See application file for complete search history.

(56)　　　　　　References Cited

U.S. PATENT DOCUMENTS

| | | | |
|---|---|---|---|
| 11,598,463 B2 | 3/2023 | Gabbey et al. | |
| 11,698,157 B2 | 7/2023 | Gocha et al. | |
| 11,796,099 B2 | 10/2023 | Gocha et al. | |
| 11,927,287 B2 | 3/2024 | Schroter | |
| 2018/0089870 A1 * | 3/2018 | Billi-Duran | G06Q 10/20 |
| 2021/0396336 A1 | 12/2021 | Schroter | |
| 2022/0163153 A1 * | 5/2022 | Gauthier | F02M 55/004 |
| 2022/0243850 A1 | 8/2022 | Teasley et al. | |
| 2023/0184360 A1 | 6/2023 | Gabbey et al. | |

FOREIGN PATENT DOCUMENTS

WO　　　　2022128266 A1　　6/2022

* cited by examiner

*Primary Examiner* — Matthew Mikels
(74) *Attorney, Agent, or Firm* — Paschall & Associates, LLC; James C. Paschall

(57)　　　　　　ABSTRACT

A quick connector arranged to display a scannable image that verifies that engaging components of a quick connector have made a connection. A connector body includes an internal passage centrally located in the connector body adapted so that a pipe can be inserted into the passage. A latch member is located on the connector body that is movable from a pipe insertion position that facilitates the insertion of the pipe into the connector body internal passage, to a latch position that captures and retains the pipe to the connector body. A scannable image inscribed on the latch member is hidden and unreadable in the insertion position. Moving the latch member to the latching position captures the pipe and uncovers the scannable image which can read by a machine scanner to verify the connection.

19 Claims, 6 Drawing Sheets

LATCH VERIFICATION UTILIZING A SCANNABLE IMAGE

TECHNICAL FIELD

This disclosure is generally directed to quick connectors. More specifically, it relates to a quick connector that reveals a scannable image verifying that the quick connector has made a proper connection.

BACKGROUND

Quick connectors are mating assemblies that allow for convenient, quick, fluid-tight connections between two or more pipes, tubes, or similar components. Quick connectors are commonly used in the automotive industry to connect tubing used in engine cooling line connections, fuel and brake connections, vapor connections or, more recently, in cooling circuits used to cool batteries of electric or hybrid vehicles. Quick connectors typically include a female connector for receiving a male connector, or a male connector for receiving a female connector. In operation, when fully disposed within the female connector, the male connector is locked in position allowing for leak-free fluid communication between a first tube in fluid communication with the female connector and a second tube in fluid communication with the male connector. Unfortunately, many conventional quick connectors suffer from numerous drawbacks associated with locking together the components that are not fully connected or not locked in position, resulting in failed connections and leaks.

It would be desirable to provide a machine scannable image that verifies that the engaging components of a quick connector has made a proper connection.

SUMMARY

This disclosure relates to a quick connector arranged to display a scannable image that verifies that the mating components of a quick connector are properly engaged and have made a proper connection.

In a first embodiment, a connector is disclosed that includes a connector body having a receiving portion surrounding an internal passage. The internal passage is arranged to receive a pipe therein. A latch member having at least a first leg is retained in the receiving portion and postionable into a latched position. A scannable image is inscribed to the first leg wherein moving the latch member to the latched position retains the pipe to the connector body and causes the scannable image to be readable using a machine scanner.

A method for verifying a latched connection of a connector is also disclosed comprising, a connector body having a receiving portion surrounding an internal passage, the internal passage arranged to receive a pipe therein. A latch member is retained on the receiving portion that is movable between a pipe insertion position that accepts the pipe into the internal passage to a latched position. The method further includes inscribing a scannable image on the latch member and moving the latch member to the latched position to retain the pipe to the connector and cause the scannable image to be readable using a machine scanner.

In a second embodiment a connector is disclosed comprising, a first connector portion surrounding an internal passage, the internal passage arranged to receive a second connector portion into the passage. A window extends through the first connection portion into the internal passage.

A first partial pattern of a scannable image is inscribed on the first connector portion bordering the window. A second partial pattern of a scannable image is inscribed on the second connector portion. The insertion of the second connector portion into the internal passage causes the second partial pattern to become visible through the window and to assemble a full scannable image readable using a machine scanner.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

In accordance with the present embodiment, there is provided a quick connector of the type commonly used in the automotive industry to connect tubing used in engine cooling line connections, fuel and brake connections, vapor connections or the like. Such as for example, a connector body and a slidable latch member. The connector body includes an internal passage centrally located in the connector body adapted so that a pipe can be inserted into the passage. The latch member is located on the connector body and is slidable from a pipe insertion position that facilitates the insertion of the pipe into the connector body internal passage, to a latch position that captures and retains the pipe within the connector body.

In a first embodiment, a scannable image is inscribed on the latch member and is hidden and unreadable when the latch is in the insertion position. Moving the latch member to the latching position captures the pipe installed in the connector body and uncovers the scannable image. The scannable image is read by a machine scanner to verify and record a positive connection of the components of the quick connector during the assembly of the quick connector on a vehicle or during a manufacturing process.

In a second embodiment, a first partial portion of the scannable image is inscribed on a surface of a first connector portion surrounding a window that extends through the first connector portion into an internal passage of the first connection portion. A second partial portion of the scannable image is inscribed on the surface of a second connector portion. The second connector portion is arranged to be inserted into and accepted within the internal passage. When the second connector portion is not assembled to the connector body, only the first partial portion of scannable image is visible. Since only the first partial portion of the scannable image is visible the scannable image is unreadable by the machine scanner. However, when the second connector portion is assembled and captured by a latching spring by the first connector portion, the second partial portion of the scannable becomes visible through the opening completing the full scannable image. The second partial portion visible through the opening provides the missing portion to the first partial portion of the scannable image and produces a full scannable image that can be read using a machine scanner.

Figure 1:
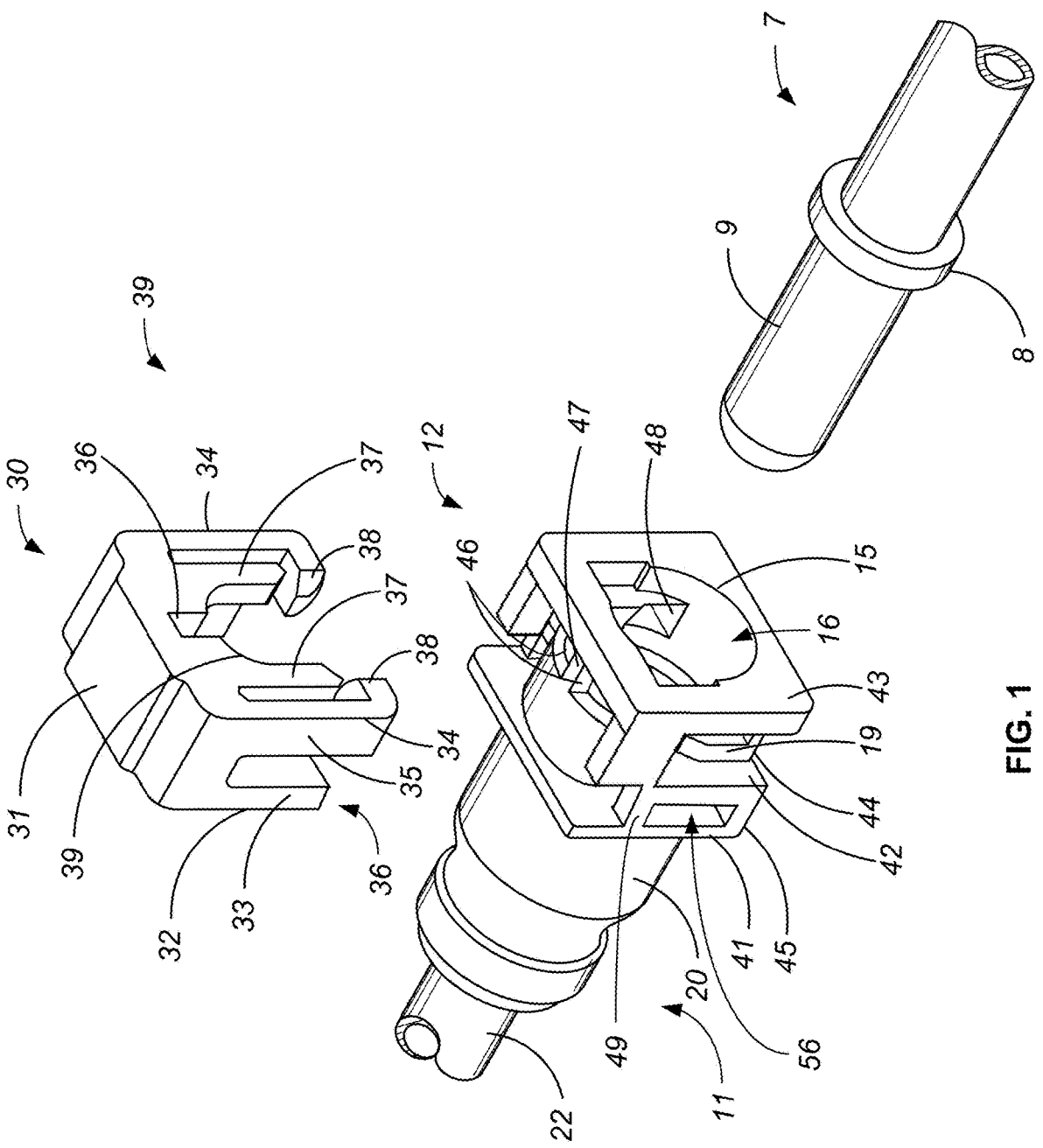
FIG. 1 is an exploded perspective view showing a quick connector in accordance with the present disclosure.

Turning now to FIG. 1, a quick connector assembly of the type used by the first embodiment of the present disclosure is illustrated. The quick connector includes a connector body 11, a pipe 7 and a latch member 30. The pipe 7 is arranged to be installed into connector body 11 and may be made of, for example, of metal or a plastic material, formed in a substantially round pipe shape. A flange portion 8 forms a bulge portion that projects annularly from the outer peripheral surface of pipe 7 spaced a predetermined distance from the frontal end portion 9 of the pipe 7. The pipe 7 may be an endform formed on an end of a pipe or could be, for example, a fitting that may be attached to pipe 7 by any convenient means, such as by soldering, laser welding or the like.

As shown in FIG. 1, the connector body 11 is made of, for example, a resin plastic and is formed in a substantially cylindrical shape. One end of the connector body 11 includes pipe receiving part 12 arranged to accept pipe 7 into an opening 15. The other end of the connector body 11, includes a coupling end 20 used to couple the connector body 11 to another device. The coupling end 20 may include a male stem 22 for mating with a receptacle of another device. The male stem 22 may also include one or more barbed flanges 24 that can have a tube (not shown) made of, for example, a synthetic resin friction fitted onto the male stem 22 over flanges 24, thereby making a fluid coupling to connector body 11. Fluid from pipe 7 can pass from the pipe into an internal passage, partially shown by passage 16 in the connector body 11 and through the male stem 22 of the coupling end 20 and into tube or vice-versa.

An internal passage 16 is formed in the interior of connector body 11 that includes annular interior walls shaped to accept the frontal end portion 9 and pipe bulge 8 of the pipe 7. One or more O-rings (not shown) may be installed in the internal passage 16 to provide a liquid tight seal between the pipe 7 and connector body 11.

As shown in FIG. 1, first and third flanges members 41 and 43 are arranged on the outer peripheral surface of the pipe receiving part 12 in parallel to each other on either end of receiving part 12. Each of the first and third flange member 41 and 43 is formed in a substantially square shape having upper, lower, left, and right side edges. A second flange member 42 is formed so as to expose the upper part of the pipe receiving part 12. A flat lower surface 44 extends between the second flange 42 and the third flange 43 horizontally along the tangential direction of the lower end surface. The flat lower surface 44 is slightly recessed from the lower edges of the first and second flange members 42 and 43.

A plate portion 45 extends horizontally in the left-right direction along the tangential direction of the lower end surface of the pipe receiving part 12 between first flange member 41 and second flange member 42. The left and right end portions of the lower plate portion 45 are flush with both side edges of both flange members 41 and 42.

A pair of left and right insertion holes 46 are located in a front half portion of pipe receiving part 12 between the third flange member 43 and the second flange member 42. As shown in FIG. 1, a pair of receiving holes 48 (only one shown in FIG. 1) correspond to the two insertion holes 46 and are formed symmetrically in the lower half of the pipe receiving part 12. A cross-member 49 extends transversely on each side of the receiving part 12 between the first and second flanges 41 and 42 forming a rectangular opening 56 between the cross-member 49 and lower plate portion 45.

As shown in FIG. 1, a latch member 30 molded from a resin thermoplastic material has a top portion 31, left and right guide legs 32, left and right latching legs 34, and left and right tube retaining pieces 37. The top portion 31 is formed in a substantially flat plate shape and sized to fit between the first flange member 41 and the third flange member 43 so as to be fitted into the pipe receiving part 12 from above. The left and right guide legs 32 are formed in a long and narrow plate shape having a flat front surface 33 extending symmetrically and downward from both left and right ends of the rear half of the top portion 31. The two guide legs 32 are slidably engaged from above between the first flange member 41 and the second flange member 42 in the pipe receiving part 12. The left and right latching legs 34 are formed in left and right symmetrical shapes from the left and right ends of the front half of top portion 31, respectively, and are formed in elongated thin plate shapes having a flat front surface 35 extending downward from top portion 31. The two latching legs 34 are slidably engaged from the upper side to the lower side between the second flange member 42 and the third flange member 43 of the pipe receiving part 12.

Latching legs 34 are formed so as to be elastically deformable, that is, flexibly deformed in the direction in which the lower ends are expanded. As shown in FIG. 1, substantially square plate-shaped latch projections 38 are protruded from the lower ends of both latching legs 34 so as to face each other. The two latch projections 38 are engaged with the upper ends of the respective receiving holes 48 of the pipe receiving part 12 by utilizing the elastic deformation of the respective latching legs 34 so as to enter the recesses 48. In this state, the distal ends of the two latch projections 38 protrude into the pipe connection part 12 retaining latch member 30 to the pipe receiving part 12 in a "pipe insertion position".

When the latch member 30 is attached to the connector body 11 in the tube insertion position, the two latch projections 38 slide along the outer peripheral surface of the pipe connection part 11 while the two latching legs 34 are elastically deformed outward of the complementary outer peripheral surfaces of the pipe receiving part 12. The elastically deformed latching legs 34 are elastically restored by extending under concave portions 49 and into receiving holes 48, engaging the two latching projections 38 into both receiving holes 48. At this time, the up and down movement of the latch member 30 is restricted by the two latch projections 38 facing the upper and lower surfaces of the concave portion 49 of receiving holes 48.

As shown in FIG. 1, the left and right retaining pieces 37 are formed in a long thin symmetrical left and right plates shapes that extend downward from the front end of the top portion 31. A locking groove 39 is formed between the two retaining pieces 37 so as to form an inverted U shape and to receive the pipe 7 in the radial direction. Both retaining pieces 37 are inserted into the two insertion holes 46 of the pipe connection part 12 from above. When the latch member 30 is at the pipe insertion position, both retaining pieces 37 are only partially installed in insertion holes 46. An interruption slot 36 is formed between the upper ends of both retaining pieces 37. The interruption slot 36 is formed so as to be able to receive a partition 47 located between the two insertion holes 46.

With the latch member 30 installed in the connector body 12 in the pipe insertion position, the pipe 7 is inserted into the pipe receiving part 12 through opening 15. The tube 7 is inserted into the internal passage 16 until the flange 8 comes in contact with a front end face formed in the internal passage. The front end portion 9 of pipe 7 extends into internal passage 16 within coupling end 20 (not shown). Rubber O-rings mounted within internal passage 16 contact an outer surface of the front end portion 9 of the pipe 7 and by utilizing elastic deformation, provides a liquid tight seal between pipe 7 and the connector body 11.

When the top portion 31 of the latch member 30 is pushed downward, the latch member 30 is disengaged from the tube insertion position. The latching projections 35 of the two latching legs 34 disengage from receiving holes 48 and move down along the inclined surfaces 19 to descend and finally pass through the flat lower surface 44. Once beyond lower surface 44 latching legs 34 regain their relaxed positions. Any upward movement of the latch member 30 is prevented by the engagement of the two latching projections 35 against the bottom of flat lower surface 44. At the same time, the interrupt slot 36 of the latch member 30 engages with the partition 47 of the pipe receiving part 12. With slot 36 engaged against partition 47, downward movement of the latch member 30 is stopped positioning the latch member 30 is in the "latched position".

Figure 2:
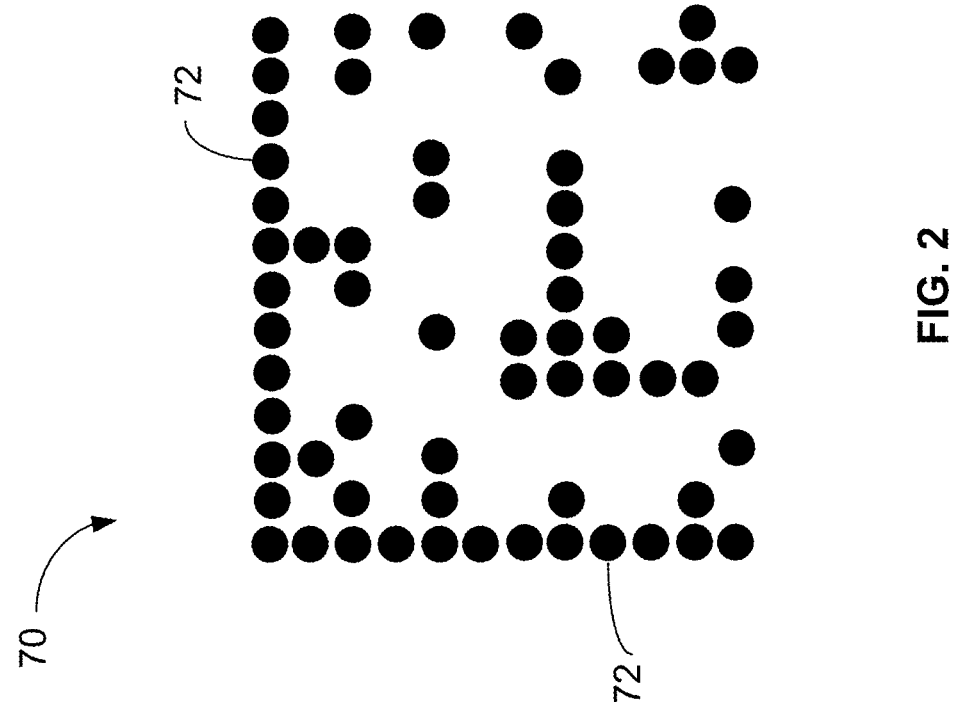
FIG. 2 illustrates an exemplary pattern of the scannable image in accordance with the present disclosure.

An example scannable image 70 that can be read and recorded by a machine scanner is shown in FIG. 2. The example scannable image 70 is inscribed, e.g., marked using a laser that interacts with the material of the front surface 33 to slightly alter its properties or appearance without removing material. The scannable image is marked on the front surface 33 of each of the left and the right guide legs 32 (only the left guide leg is shown in FIG. 1). The example scannable image 70 is comprised of a series of circular shapes 72 spatially distributed in a predefined pattern with one another formed by inscribing the predefined pattern on the front surface 33 of each leg 32. The pattern of the scannable image 70 is readable by the machine scanner to verify that a proper connection between pipe 7 and connector body 12 has been made.

In an embodiment, the predefined pattern of the scannable image 70 is formed by laser marking. A laser marking machine (not shown) is used to direct a beam of light produced by a semiconductor laser device on the front surface 33 of each leg 32 that stains or discolors the material. The low-powered light beam, when guided slowly across the surface of the material produces high-contrast markings on the material by creating small gas bubbles under the surface of the material without vaporizing the material. This process, also known as laser foaming, heats the surface of the plastic material. The heat causes oxidation of gas bubbles, (i.e., foam) under the surface of the material where the beam of light is directed, causing the staining and the creation of the scannable image 70. Thermoplastic materials marked with a laser marking device remain in the same color family as the original material, with only variations in light and dark. For example, a blue plastic material being marked will not be able to have a portion altered to be green, red, yellow, or other colors. Shade variations are possible, however, with dark plastics being changed to a lighter shade and light plastics being changed to a darker one.

As illustrated in FIG. 2 the pattern of the scannable image 70 is comprised of a plurality of the geometric shapes such as the circular shapes 76 located in a defined spatial distribution to one another. It will be well understood however, that other geometric shapes, such as squares, rectangles, triangles and straight or curved lines may be inscribed on front surface 33 by the laser marking device to generate the pattern of the scannable image 70. Additionally, the scannable image could be formed as a data matrix code, such as for example a QR code, a maxicode or a bar code, having registration and finder features.

In another embodiment the pattern of the scannable image 70 may be made by a die tool using either a heat stamping or cold stamping process that transfers the pattern of the scannable image 70 to surface 33 from the die. The die would contain the pattern on its face which would be applied to the front surface 33 by pressing the die face on surface 33 to cause the transfer of the pattern by staining the surface using a heat process to slightly discolor the material surface or to apply an ink to transfer the scannable image 70 to the front surface. As with the laser marking device other geometric forms, such as squares, rectangles, triangles and straight or curved lines may be stamped on front surface 33 by the die tool to generate the patterns of the scannable image 70. As explained above, a data matrix code, such as for example a QR code, a maxicode or a bar code, having registration and finder features may also be formed on the front surface 33 using the die tool.

Figure 3:
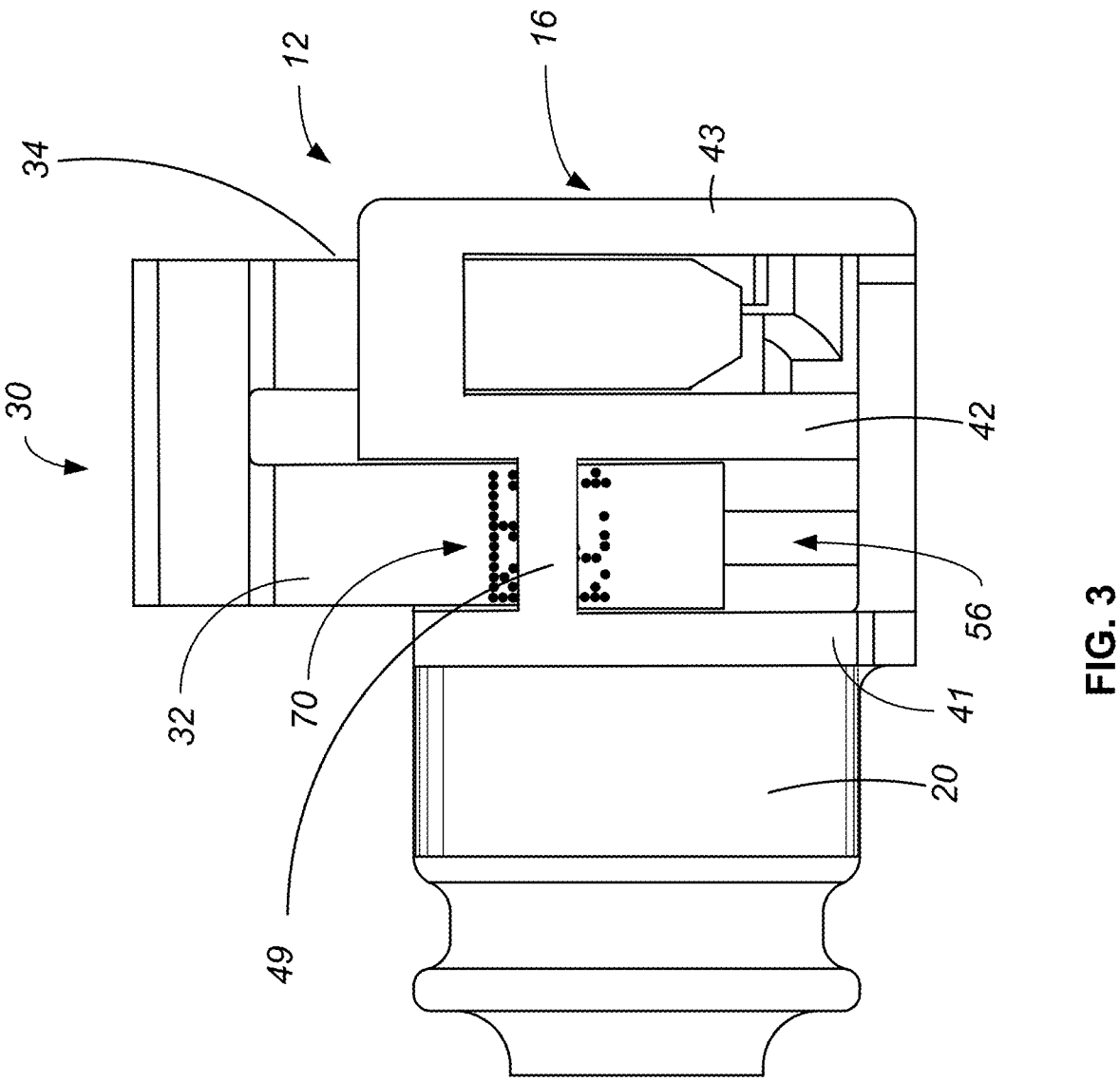
FIG. 3 is a side elevational view of a quick connecter having a latch member in a pipe insertion position in accordance with a first embodiment of the present disclosure.

FIG. 3 illustrates the latch member 30 installed on the connector body 12 in the pipe insertion position. In the pipe insertion position the pipe 7 may be installed into connector body 12 through passage 16. As shown in FIG. 3 (illustrating the left leg 32 of the latch member 30) in the pipe insertion position, the full pattern of the scannable image 70 is not visible due to the scannable image 70 being located behind cross-member 49 and therefore not readable by the machine scanner. The scannable image 70 may be completely blocked from view by the cross-member 49 or only partially obstructed. A partial obstruction as shown in FIG. 3, would not allow the machine scanner to read the full pattern of the scannable image 70.

Figure 4:
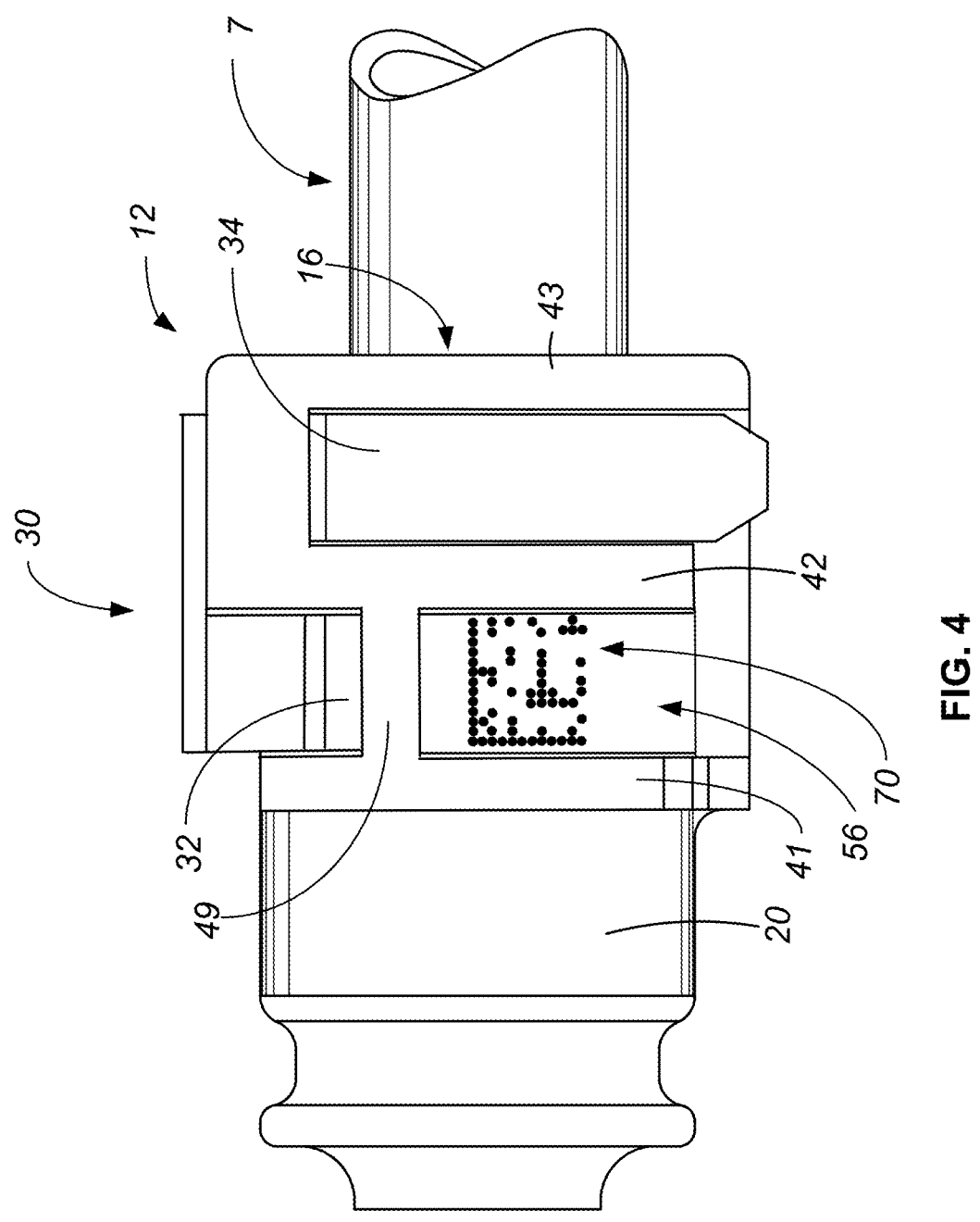
FIG. 4 is a side elevational view of the quick connector of FIG. 2 having the latch member in a latched position in accordance with the first embodiment of the present disclosure.

As shown in FIG. 4, moving the latch member 30 into the latch position slides the guide leg 32 and surface 33 downward into opening 56, moving the scannable image 70 away from cross-member 49 exposing the complete pattern of the scannable image 70 within opening 56. In the latched position, the pattern of the scannable image 70 can be read through the window 56 by the machine scanner. The latch member 30 and the therefore the pattern of the scannable image 70 will not enter into the latched position unless the proper connection is made between the pipe 7 and the connector body 12.

Figure 5:
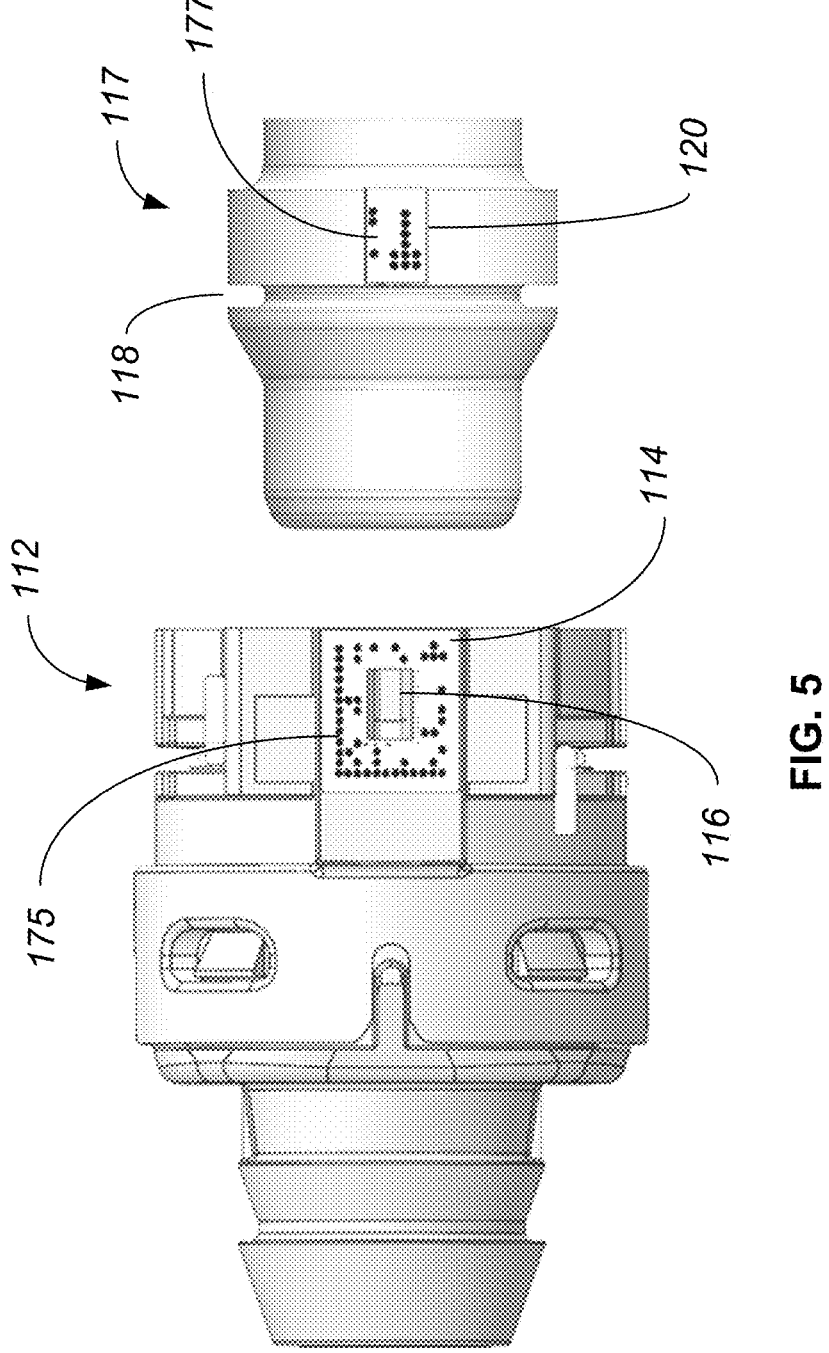
FIG. 5 is a side elevational view of a connector body and endform each having a portion of a pattern of the scannable image inscribed on the connector body and endform in accordance with a second embodiment of the present disclosure.
Figure 6:
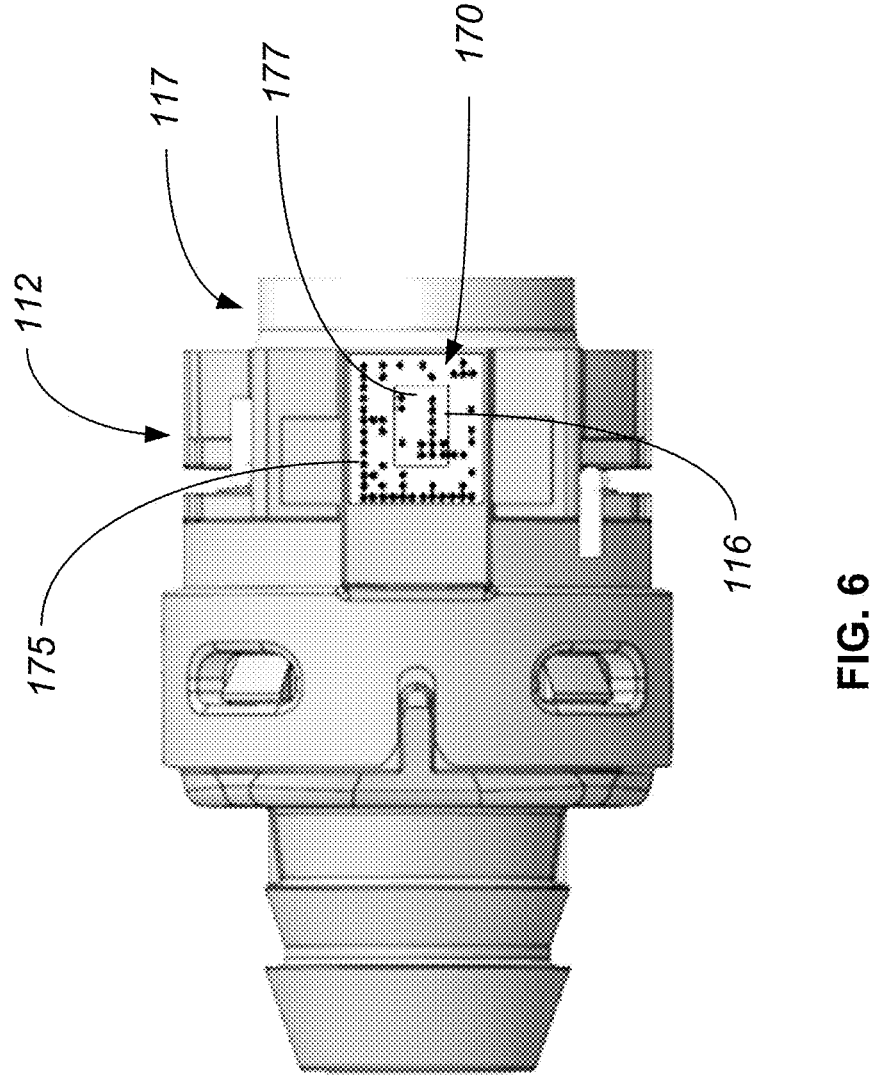
FIG. 6 is a side elevational view showing the endform latched to the connector body of FIG. 3, showing the full pattern of the scannable image in accordance with the second embodiment of the present disclosure.

Turning now to FIGS. 5 and 6, an exemplary second embodiment of the present disclosure is illustrated. In FIG. 5 a first connector portion includes a connector body 112 having a planar surface 114 located on the connector body 112. A window 116 extends through the connector body 112 into an interior passage. A second connector portion includes an endform 117 arranged to be inserted into and accepted within the interior passage of connector body 112 and be lockingly engaged by an internal retaining spring (not shown) being captured within groove 118 of the endform 118. The endform further includes a planar flat surface 120.

A first partial portion 175 of a pattern of a scannable image is inscribed on the planar surface 114 of the connector body 112 surrounding window 116 using laser marking or die stamping in the manner as discussed above, using a laser marking device or a die tool. A second partial portion 177 of the pattern of the scannable image is inscribed on the surface 118 of endform 117. When the endform 117 is not assembled to the connector body 112 only the first partial portion 175 of the pattern of the scannable image 170 is visible.

Since only the first partial portion 175 of the pattern is visible on the connector body 112 it is unreadable by the machine scanner. However, when the endform is assembled to the interior passage and captured by the latching spring, the second partial portion 177 becomes visible through the window 116 completing the full pattern of the scannable image 170 as shown in FIG. 6. The second partial portion 177 on the endform when visible through the window 116 provides the missing portion to the first partial portion 175 producing the full pattern of the scannable image 170 that can be read and recorded by a machine scanner indicating a positive latch connection between the endform 117 and the connector body 112.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," or system within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A connector comprising:
a connector body having a receiving portion surrounding an internal passage, the internal passage arranged to receive a pipe therein;
a latch member having at least a first leg retained in the receiving portion the latch member positionable into a latched position; and
a scannable image inscribed on the first leg,
wherein moving the latch member to the latched position retains the pipe to the connector body and causing the scannable image to be readable.

2. The connector of claim 1, wherein the connector body includes first and second flanges the first and second flanges defining the connector receiving portion, and an opening located between the first and second flanges extending into the connector receiving portion.

3. The connector of claim 2, wherein the latch member is positionable into a pipe insertion position that allows insertion of the pipe into the internal passage and the first and second flanges further include a cross-member extending between the first and second flanges, wherein in the pipe insertion position the latch member first leg is located behind the cross-member preventing the scannable image from being readable.

4. The connector of claim 2, wherein in the latched position the first leg extends into the opening and the scannable image becomes readable by a machine scanner through the opening.

5. The connector of claim 3, wherein the cross-member obstructs portions of the scannable image to prevent the scannable image from being readable by the machine scanner.

6. The connector of claim 3, wherein the cross-member obstructs the entire scannable image to prevent the scannable image from being readable by the machine scanner.

7. The connector of claim 1, wherein the scannable image is a geometric pattern marked on a front surface of the first leg of the latch member.

8. The connector of claim 7, wherein the geometric pattern is marked using a laser device that stains the front surface to cause the geometric pattern to be formed on the front surface.

9. The connector of claim 7, wherein the geometric pattern is marked on the front surface of the first leg using a die having the geometric pattern represented on a die face, wherein the geometric pattern is transferred from the die face to the front surface of the first leg by pressing the die face to the front surface.

10. A method for verifying a latched connection of a connector, the method comprising:
providing a connector body having a receiving portion surrounding an internal passage the internal passage arranged to receive a pipe therein;
providing a latch member retained on the receiving portion, movable between a pipe insertion position and a latched position, wherein in the pipe insertion position the pipe is inserted into the internal passage;
inscribing a scannable image on the latch member; and
moving the latch member to the latched position retaining the pipe to the connector and causing the scannable image to be readable.

11. The method of claim 10, wherein the connector body includes:
first and second flanges defining the receiving portion;
a cross-member extending between the first and second flanges; and
an opening extending into the receiving portion located between the first and second flanges.

12. The method of claim 11, wherein the latch member includes:
at least a first leg having a front surface wherein the first leg extends into the receiving portion behind the cross-member.

13. The method of claim 12, wherein the cross-member prevents the scannable image from being readable by a machine scanner.

14. The method of claim 12, wherein in the latched position the first leg extends into the opening and the scannable image become readable by the machine scanner through the opening.

15. The method of claim 13, wherein the cross-member obstructs portions of the scannable image preventing the scannable image from being readable by the machine scanner.

16. The method of claim 13, wherein the cross-member obstructs the entire scannable image preventing the scannable image from being readable by the machine scanner.

17. The method of claim 11, wherein the scannable image is a geometric pattern marked onto the front surface of the first leg of the latch member.

18. The method of claim 17, wherein the geometric pattern is marked using a laser device that stains the front surface to cause the geometric pattern to be formed on the front surface.

19. The method of claim 18, wherein the geometric pattern is marked on the front surface of the first leg using a die tool having the geometric pattern represented on a die face, wherein the geometric pattern is transferred from the die face to the first leg by pressing the die face to the front surface of the first leg.

* * * * *